(12) United States Patent
Uhlemann

(10) Patent No.: US 8,472,429 B2
(45) Date of Patent: Jun. 25, 2013

(54) DEVICE FOR TRANSMISSION OF COMMUNICATION SIGNALS

(75) Inventor: Stefan Uhlemann, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 2118 days.

(21) Appl. No.: 11/039,392

(22) Filed: Jan. 19, 2005

(65) Prior Publication Data

US 2005/0185667 A1 Aug. 25, 2005

(30) Foreign Application Priority Data

Jan. 19, 2004 (DE) .......................... 10 2004 002 694

(51) Int. Cl.
*H04L 12/66* (2006.01)

(52) U.S. Cl.
USPC .......................................................... 370/352

(58) Field of Classification Search
USPC ................. 370/342, 347, 351, 430, 480, 201, 370/294, 295, 498, 524
See application file for complete search history.

(56) References Cited

U.S. PATENT DOCUMENTS

| | | | |
|---|---|---|---|
| 6,850,618 B1 * | 2/2005 | Mohajeri et al. | 379/399.01 |
| 6,917,624 B1 * | 7/2005 | Gorman | 370/430 |
| 7,035,380 B1 * | 4/2006 | Bingel et al. | 379/22.03 |
| 7,065,072 B1 * | 6/2006 | Quiles et al. | 370/352 |
| 2003/0156632 A1 * | 8/2003 | Dowling | 375/222 |
| 2006/0120407 A1 | 6/2006 | Kirshenboim et al. | |

FOREIGN PATENT DOCUMENTS

| | | |
|---|---|---|
| DE | 10126569 A1 | 11/2002 |
| EP | 1 156 655 A2 | 5/2001 |
| EP | 1156655 A2 | 11/2001 |

* cited by examiner

*Primary Examiner* — Yong Zhou
(74) *Attorney, Agent, or Firm* — Eschweiler & Associates, LLC

(57) ABSTRACT

The present invention relates to a device (1) for transmission of communication signals between a master station location and a number of subscribers and in particular a device for transmission of a first communication signal in the form of an analogue telephone signal or ISDN data signal. The device contains corresponding interface means (11) for this. It is provided according to the invention that the device (1) is developed such that a further interface means (3) in the form of a DSL modem can be linked, in order additionally to transmit a second communication signal, preferably a broadband communication signal, over ports (15) for the transmission of the first communication signal. For this purpose, the device contains correspondingly developed distribution or addition means.

17 Claims, 4 Drawing Sheets

DEVICE FOR TRANSMISSION OF COMMUNICATION SIGNALS

FIELD OF THE INVENTION

The present invention relates to a device for transmission of communication signals between a master station location and a number of subscribers and in particular a device for transmission of analogue telephone signals or ISDN data signals.

BACKGROUND

In a transmission of communication signals, especially analogue telephone signals and/or ISDN data signals, pairs of copper lines which each connect a subscriber to a master station location are used. Switching of the corresponding communication signals to a number of subscribers takes place in the master station location. For this purpose, so-called line cards are usually provided in the master station location; these cards supply a port for each of the subscribers.

In order to grant the individual subscribers access to a broadband communication network in addition to analogue telephone services or ISDN services, e.g. for Internet applications, it is usual additionally to apply broadband communication signals to the copper lines. In this so-called DSL transmission method (Digital Subscriber Line transmission method), a frequency range is used which is located above that used for analogue telephone signals and/or ISDN data signals. To achieve decoupling of the low frequency range communication signals for analogue telephone applications and ISDN applications, so-called splitters are used. The splitters are a suitable combination of high-pass and low-pass filters, and are always necessary in the master station location and usually at the subscribers too. Conventionally, a telephone/ISDN line card is provided in the master station location for a group of subscribers, as well as a DSL modem for each subscriber with access to the broadband communication network, this equipment being connected via a splitter to the respective port assigned to the subscriber. The provision of access to the broadband communication network by means of a DSL transmission method for a subscriber thus requires the installation of a splitter and a DSL modem in the master station location, and thus involves a considerable cost in both material and working time. In particular, this cost arises again for each new access to be provided. This in turn means that the provision of access to a broadband communication network for the corresponding subscriber typically involves comparatively high costs.

Known in this context from the EP 1 156 655 A2 is an interface system for use in a master station location, where the connection of a DSL modem to a telephone line card is developed in such a way that an external splitter can be dispensed with. This is achieved by the provision of a reactive impedance on the subscriber access side of a DSL coupling transformer, this impedance taking over the splitter function. This reduces the number of components to be installed in the master station location, thus especially reducing the time required for installation and maintenance, and also the material cost.

In the use of a splitterless interface system described above, there is however a problem in that for each new access to be supplied, i.e. for each subscriber, a DSL modem must also be supplied in the master station location, or, if the DSL modem is provided as an integral function of the telephone line card, the DSL modem is installed in advance for each subscriber. There is thus a problem in this case too in that for each access to the broadband communication network to be supplied, essentially the same costs arise.

One approach for solving the aforementioned problem when supplying accesses to the broadband communication network is to set up a point-to-multipoint connection which provides that a single DSL modem in the master station location serves several subscribers, as is the case, for example, in so-called broadcast DSL transmission methods. A common transmission path is partially used here for transmission of the communication signals. Since a DSL modem does not have to be supplied in the master station location for each subscriber in this case, the cost of supplying accesses to a broadband communication network can be further reduced.

The structure of a communication network with a DSL point-to-multipoint connection according to the prior art is shown by way of example in FIGS. 6a and 6b. Here a device for transmission of communication signals or line card, e.g. a telephone or ISDN line card 1', is connected to a number of subscribers 2. In a transmission path, a splitter 4 is inserted between the subscribers 2 and the line card 1' in each case. The splitters 4 each have a low-pass output, via which a connection to the line card 1' is established, and a high-pass output for the connection to a DSL modem.

In the variants shown in FIG. 6a, the high-pass outputs of the splitters 4 are interconnected, achieving a signal summation in the DSL frequency band. The interconnected high-pass outputs are connected to a DSL modem 3' developed especially for use with point-to-multipoint connections. A broadband communication signal which is transmitted from the DSL modem 3' to one of the subscribers is therefore presented to all subscribers 2. In a transmission of the broadband communication signal in the reverse direction, i.e. from one of the subscribers 2 to the DSL modem, a split of the common transmission path is necessary. This can happen, for example, with an access control which allocates the subscribers 2 time slots for accessing the transmission path, e.g. a so-called TDMA access control ('Time Domain Multiple Access' access control), or can be achieved with a so-called CDMA access control ('Code Division Multiple Access' access control), in which signals of all subscribers 2 are simultaneously transmitted and the communication signals of each subscriber 2 are each individually given a corresponding CDMA code and a switch of carrier frequencies follows corresponding to the CDMA code.

FIG. 6b shows a technically more costly variant, in which the merging of the high-pass outputs of the splitters 4 occurs within the DSL modem 3".

Since in the solutions presented above an external splitter has to be installed for each of the subscribers in the master station location, there exists a problem of a high material and time cost for the supply of the accesses to the broadband communication network.

SUMMARY

The object of the present invention is consequently to supply a device for transmission of communication signals between a master station location and a number of subscribers, said device solving the given problem and in particular, without significant added cost in comparison to a conventional telephone or ISDN line card, enabling a network operator to supply subscribers as necessary with an access to a broadband communication network.

This object is achieved with a device with the features of embodiments of the invention.

The present invention relates to a transmission of communication signals between a master station location and a number of subscribers, the device including for each subscriber an interface means, which in each case supplies a port assigned to the subscriber for transmission of a first communication signal between the master station location and the subscriber. The device includes means of addition, by which the ports assigned to the individual subscribers are merged to a further port, so that a further interface means can be linked, in order to transmit a second communication signal between the master station location and at least one of the subscribers over the ports for transmitting the first communication signal. A connection between the further interface means, which is preferably formed by a DSL modem, and the multiple subscribers is thus a point-to-multipoint connection. Here the first communication signal can in particular comprise analogue telephone signals or ISDN data signals. The second communication signal can in particular be broadband communication signals, e.g. communication signals in a DSL transmission method.

For the transmission of the first and the second communication signals, different frequency ranges are preferably supplied. Transformer means are advantageously supplied for this, which in a preferred high frequency range effect an inductive coupling of the ports assigned to the subscribers with the further port.

Capacitor means can also be provided, which effect a capacitive decoupling of the ports assigned to the subscribers from the further port. These capacitor means are preferably arranged between the ports assigned to the subscribers and the further port, so that an effective decoupling results in the range of low frequencies.

The addition means can include the transformer means by supplying for each of the ports assigned to the subscribers a separate primary transformer winding which is inductively coupled with a common secondary transformer winding. However, the device can also include a separate transformer means for each of the ports assigned to the subscribers. This leads to an improved line termination of lines connected to the ports assigned to the subscribers, for connection to the subscribers.

The device preferably includes signal conditioning means, which signal conditioning means can be developed in particular for splitting the second communication signal into an incoming and an outgoing communication signal, i.e. to effect a so-called 2/4 wire conversion. The signal conditioning means can further include an analogue echo compensation or amplifier, so that the further port can be implemented in the form of a non-proprietary interface for a DSL modem.

It is especially preferable if the signal conditioning means include a bridge circuit, of which one branch is formed by first impedances and the other branch by at least one second impedance of the connected lines. In this case, the addition means can be developed such that they are disposed between the signal conditioning means and the port provided for the DSL modem. A separate 2/4 wire conversion can thereby be implemented for each subscriber, so that a defined line termination in the DSL frequency band (typically 100Ω) and a good decoupling between the ports assigned to the subscribers are achieved. The defined line termination in the DSL frequency band enables higher transmission ranges and data rates for the DSL transmission method.

In addition, the device can include a further interface means for transmission of the second communication signal, the second interface means preferably being a DSL modem developed for use with a point-to-multipoint connection.

A preferred area of application for the invention relates to a line card, which is developed for transmission of analogue telephone signals and/or ISDN data signals as a first communication signal.

The transmission of communication signals using a device according to the invention is preferably effected by transmitting the first communication signal in a first frequency range and the second communication signal in a second frequency range, which differs from the first frequency range. A transmission of the second communication signal from the master station location to the at least one subscriber is preferably effected by transmitting the communication signal to a subscriber group including the at least one subscriber. For transmission of the second communication signal from the at least one subscriber to the master station location, a split of the transmission path among the subscribers in the group is preferably effected by a corresponding access control. For example, a TDMA access control or a CDMA access control can be used.

The present invention offers the advantage that the device according to the invention creates no notable additional costs compared to a conventional device or line card, which is developed purely for transmission of analogue telephone signals or ISDN data signals. If one of the subscribers wants to be supplied with access to a broadband communication network, this can easily be accomplished without the need to insert an external splitter. For multiple subscribers only one DSL modem is necessary, resulting in a lower overall cost, and in particular the additional cost of supplying access to the broadband communication network is negligible if a DSL modem is already installed, i.e. for example if a subscriber is already supplied with the broadband communication signal over the same device. In comparison to a solution that provides telephone and/or ISDN line cards with integrated DSL modems for every subscriber, costs from unused DSL modems of subscribers who do not want access to the broadband communication network can be avoided.

The space requirement for the solution according to the invention is reduced in comparison to the known solutions, as no external splitters are required and the number of DSL modems used is restricted to a minimum.

Furthermore, existing master station locations can easily be retrofitted by replacing line cards with the device according to the invention, without restricting the number of subscribers or creating an additional space requirement.

BRIEF DESCRIPTION OF THE DRAWINGS

The invention will be further described with reference to the included drawings on the basis of preferred embodiments.

DETAILED DESCRIPTION

Figure 1:
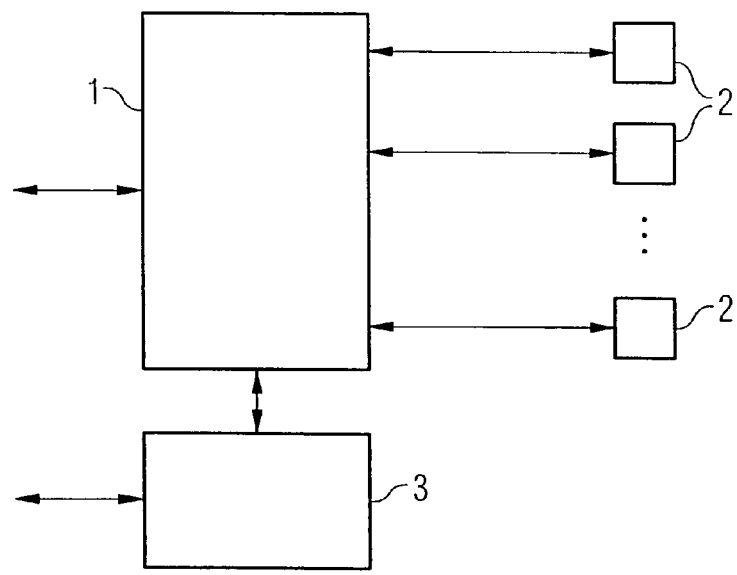
FIG. 1 is a schematic representation of an arrangement for transmission of communication signals with a point-to-multipoint connection, which includes a device according to the invention.

FIG. 1 shows an arrangement for transmission of communication signals between a master station location and a number of subscribers 2, in which a device 1 according to the invention is used for transmission of communication signals. The device 1 according to the invention for transmission of communication signals is connected over interface means (not shown in FIG. 1) to a number of subscribers 2. The device 1 is furthermore connected to a further interface means in the form of a DSL modem 3. A point-to-multipoint connection between the DSL modem 3 via the device 1 to the subscribers 2 is used for transmission of a broadband communication signal, e.g. a communication signal according to a broadcast DSL method. Based on the point-to-multipoint connection, the broadband communication signal is transmitted partially over a common transmission path.

Figure 2:
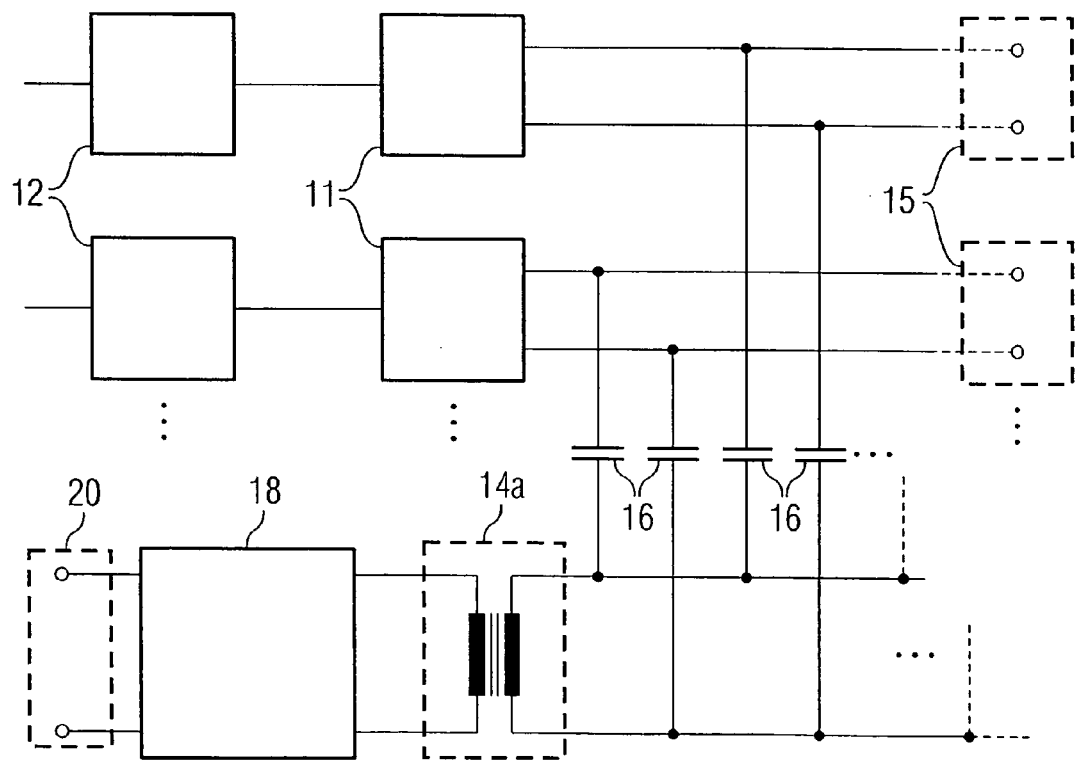
FIG. 2 shows an embodiment of the device according to the invention for transmission of communication signals.

FIG. 2 shows an embodiment of a device according to the invention for transmission of communication signals. The device, which can be developed e.g. as a telephone line card, includes a number of ports 15, each assigned to a subscriber, for transmission of a first communication signal between a master station location and the number of subscribers 2. The device includes for each of the ports 15 an interface means 11, which implements functions such as power feed, monitoring and ⅔ wire conversion. The interface means 11 are connected in each case to a code-decode unit 12. The code-decode units 12 encode communication signals transmitted from the subscribers 2 towards a telephone network, or decode communication signals transmitted from the telephone network to the subscribers. The code-decode units are digitally implemented, programmable, and cover functions for a digital/analogue conversion, an analogue/digital conversion, and digital signal-processing functions such as digital filtering or echo compensation.

The ports 15 for transmission of the first communication signal are each connected by a pair of electrical lines to the interface means 11. The subscribers 2 can be connected over a pair of electrical lines, preferably copper lines, to the ports 15. On the electrical lines between interface means 11 and the ports 15, taps are provided which are merged via capacitor means or capacitors 16 to a further pair of electrical lines. This enables a coupling of high-frequency signals into the further pair of electrical lines, while for low-frequency signals a decoupling is caused. Altogether the merging of the electrical lines and the capacitors 16 supplies an addition means, which causes an addition or a distribution of communication signals in the high-frequency range.

The further pair of electrical lines is connected via a primary winding of transformer means 14a. The primary winding is inductively coupled with a secondary winding of the transformer means 14a, so that high-frequency signals are transmitted over the transformer means 14a to a further port 20.

In addition, signal conditioning means 18 are provided between the transformer means 14a and the further port 20. The signal conditioning means 18 include a ⅔ wire conversion, an analogue echo compensation and amplifier, so that on the further port 20 a non-proprietary interface for connecting a further interface means in the form of a DSL modem 3 developed for point-to-multipoint connections can be implemented.

Figure 3:
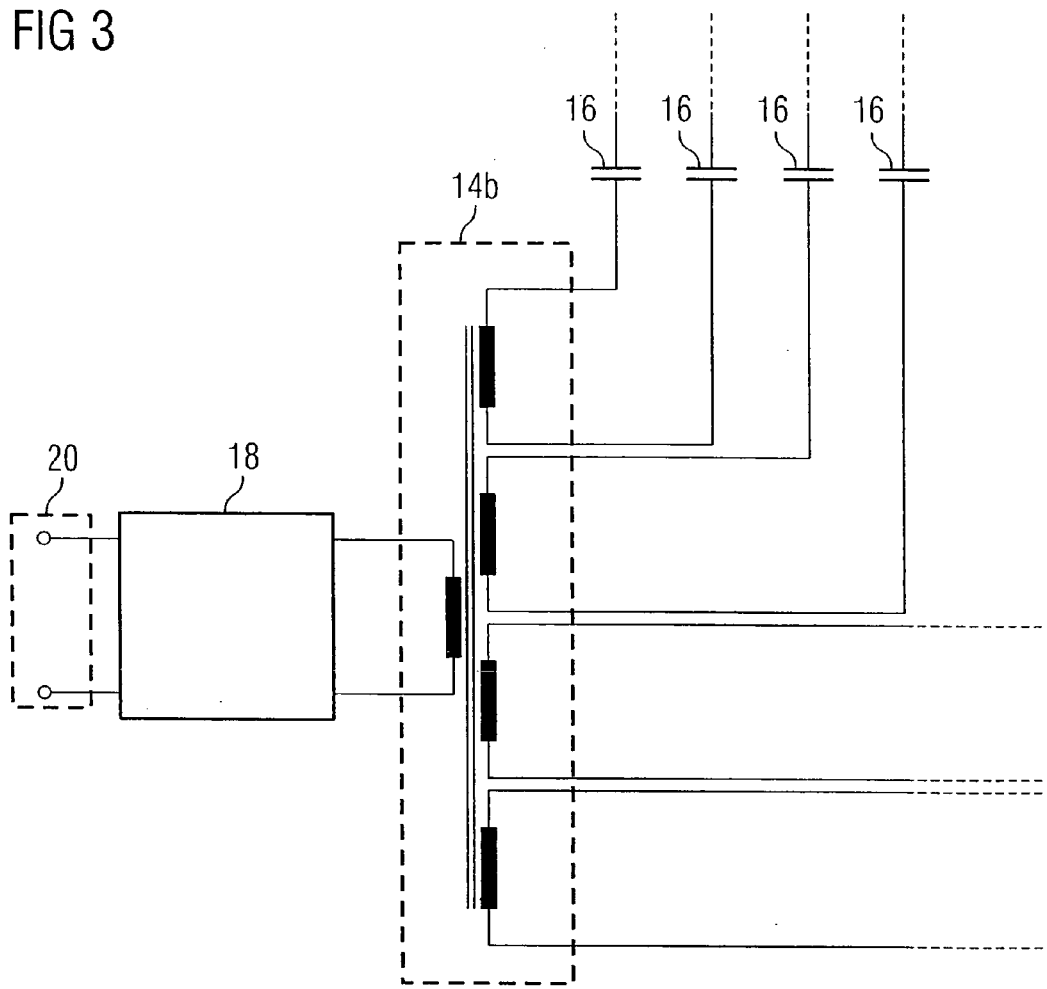
FIG. 3 shows an example of addition means, which can be used as an alternative to addition means shown in FIG. 2.

FIG. 3 shows an alternative development of the addition means. In this alternative, the taps are connected via the capacitor means 16 with a separate primary winding of transformer means 14b in each case. The separate primary windings of the transformer means 14b are jointly inductively coupled with a secondary winding of the transformer means 14b, resulting in an addition of high-frequency signals or their distribution into the transformer means 14b.

Figure 4:
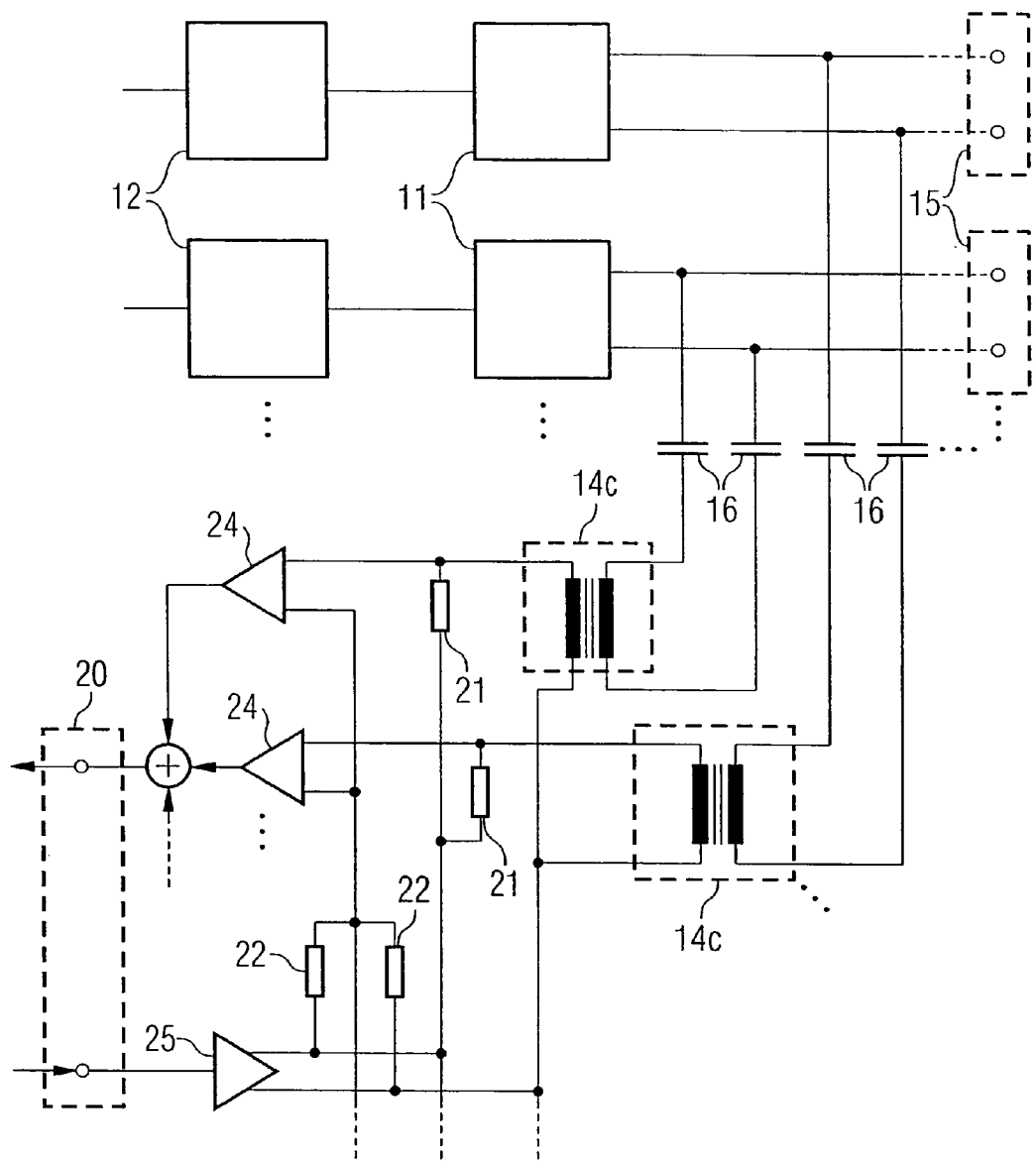
FIG. 4 shows a further embodiment of the device according to the invention with a 2/4 wire conversion for broadband communication signals.
Figure 6A:
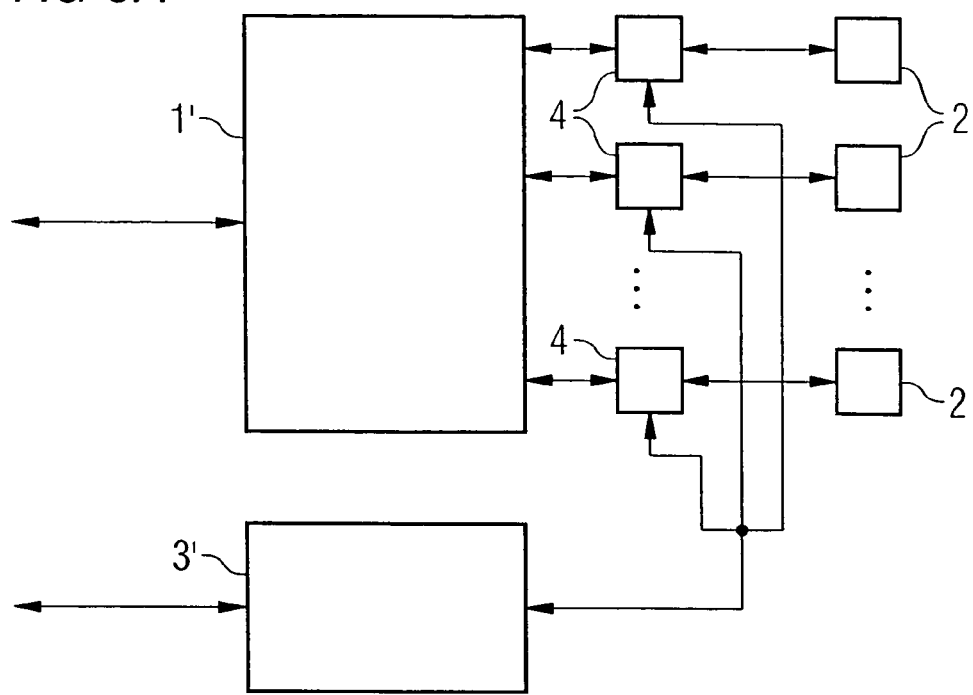
FIG. 6a shows an arrangement for transmission of communication signals with a point-to-multipoint connection according to the prior art.
Figure 6B:
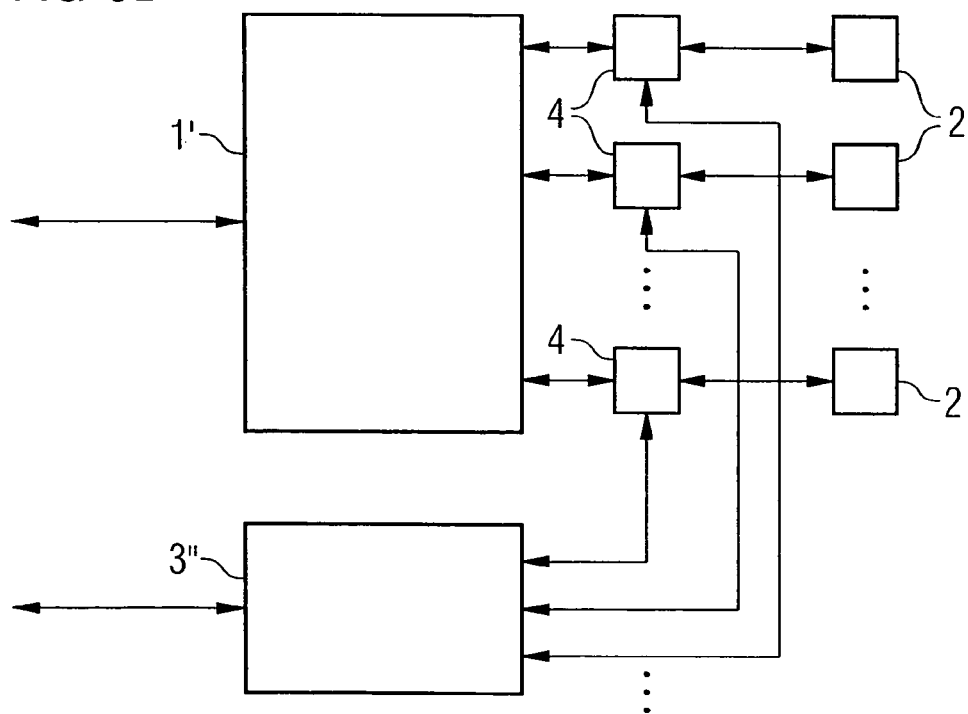
FIG. 6b shows an alternative arrangement for transmission of communication signals with a point-to-multipoint connection according to the prior art.

FIG. 4 shows a further embodiment of the device according to the invention with a ⅔ wire conversion of the broadband communication signal, the addition means being executed separately for broadband communication signals transmitted from the subscribers to the master station location. This achieves an improved decoupling of broadband communication signals belonging to the different transmission directions.

In the device shown in FIG. 4, the taps on the lines between the interface means 11 and the ports 15 are connected via the capacitor means 16 to separate transformer means 14c. In particular, this means that for each of the taps in the transformer means 14c a separate primary winding and a separate secondary winding, which is inductively coupled with the primary winding, is provided.

The secondary windings of the transformer means 14c each form, together with an impedance 21, a first branch of a bridge circuit. A second branch of the bridge circuit is formed by impedances 22. The impedances 21 essentially correspond in the DSL frequency band to an impedance of the ports 15 coupled to the primary windings of the transformer means, or of the lines connected to these, allowing for a transformation ratio of the transformer means 14c. For the pairs of copper lines which are usually used to connect the ports 15 to the subscribers 2, the impedance is about 100-200Ω. The impedances 22 of the second branch of the bridge circuit are adapted depending on the development of the overall circuit.

Taps between the impedances 21 and the secondary windings of the transformer means 14c, and between the impedances 22, are each connected to an input of a receive amplifier 24. Outputs of the receive amplifier are merged in an addition node, which is connected in turn to an access point for outgoing signals of the further port 20.

A tap between one of the impedances 22 and the impedances 21, as well as the other of the impedances 22 and the secondary windings of the transformer means 14c, is connected to an output of a transmitter amplifier 25.

By a corresponding sizing of the impedances 21 and 22, the bridge circuit is adjusted in such a way that a communication signal fed via the transmit amplifier 25 into the bridge circuit does not cause a corresponding signal at the receive amplifiers 24. Conversely, a corresponding adjustment of the impedances 22 to the impedances 21 ensures that a signal coupled via the transformer means 14c into the bridge circuit essentially causes a signal at the input of the corresponding receive amplifier 24, but not at the output of the transmit amplifier 25. A separation of incoming and outgoing communication signals, i.e. a ⅔ wire conversion, is achieved with this measure.

The first branch of the bridge circuit is executed separately for each of the taps from the ports 15, so that the ⅔ wire conversion occurs separately for each of the taps from the ports 15, and thus for each subscriber 2. The summation of the signals transmitted from the subscribers 2 to the master station location occurs after the ⅔ wire conversion immediately before the access point for outgoing signals of the further port 20.

With the separate ⅔ wire conversion, a defined line termination is achieved in the DSL frequency band, as a result of which higher transmission ranges and data rates can be achieved for DSL transmission methods used in connection with the device.

In the device shown in FIG. 4, a common transmit amplifier 25 is provided for all ports 15. However, as for the receive amplifiers 24, a separate transmit amplifier can alternatively be provided for each of the ports 15.

Figure 5:
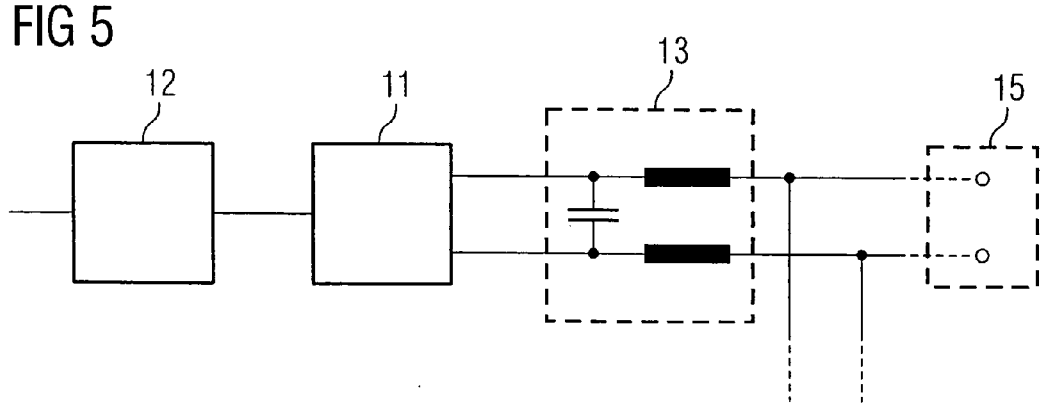
FIG. 5 shows an alternative development of connections shown in FIGS. 2 and 4 between interface means and ports for transmission of a first communication signal.

FIG. 5 shows an alternative development of the connection shown in FIGS. 2 and 4 of interface means 11 to the ports 15 for transmission of the first communication signal. In FIG. 5, a low-pass filter 13 is inserted between the port 15 and the interface means 11. The low-pass filter 13 includes a capacitor, which connects the pair of electrical lines leading to the port 15, and inductances in each of the electric lines which connect the interface means 11 with the port 15.

The modification shown in FIG. 5 can be necessary if an impedance of the interface means 11 or of the code-decode units 12 in the DSL frequency band is not sufficiently large e.g. to achieve desired data rates with a specific selected DSL transmission method. Typically, an impedance of more than 1000Ω is needed to exclude excessive attenuation of the broadband communication signal used for the DSL transmission method.

An adjustment of the impedance can also be achieved by appropriate programming of the code-decode units. The adjustment of the impedance can be effected either exclusively by programming, resulting in a simplified form of the device, or in combination with a low-pass filter, e.g. as shown in FIG. 5.

An important property of the devices of FIGS. 2 and 4 is their insensitivity to cross coupling, e.g. by a ringing voltage generator. Upon simultaneous application of a ringing voltage to more than one of the ports assigned to the subscribers, a coupling of transmission paths can be caused with conventional DSL transmission methods which are based on a point-to-point connection, i.e. in which a separate DSL modem is provided for each of the subscribers in the master station location, said coupling having to be suppressed with corresponding decoupling filters. This is not necessary for the devices described above with reference to FIG. 2 to 5, so that consequently the devices can be implemented with considerably fewer components.

The inductances of the windings of transformer means 14a, 14b and 14c, and also the capacities of the capacitor means 16 in FIGS. 2, 3 and 4 are tuned in such a way that the broadband communication signals are transmitted in a DSL frequency band provided for this purpose, while low-frequency signals, e.g. the first communication signal for telephone services, are not coupled to the further port 20.

In a transmission of the broadband communication signal from one of the subscribers 2 to the DSL modem, a split of the transmission path is necessary because of the point-to-multipoint connection. This can happen, for example, with an access control which allocates the individual subscribers 2 time slots for access to the transmission path. Such an access control is preferably implemented within the DSL transmission method used. Possibilities for use here are a TDMA access control, which assigns the subscribers time slots for access to the transmission path, or a so-called CDMA access control, in which signals of all subscribers 2 are simultaneously transmitted, the communication signals of each subscriber 2 are each individually given a corresponding CDMA code and a switch of carrier frequencies follows corresponding to the CDMA code. Monitoring of collisions can also take place in the access control, so that in the event of a collision, i.e. when two subscribers simultaneously access the transmission path, the transmission is interrupted.

The embodiments described here relate to the transmission of analogue telephone signals as a first communication signal. However, the invention is not restricted to this. A further advantageous area of application relates to transmission of ISDN data signals as a first communication signal.

It is furthermore also possible to provide the further interface means in the form of a DSL modem 3 as an element of the device, so that the installation cost is further reduced.

The invention claimed is:

1. A device for transmission of communication signals between a master station location and a number of subscribers, comprising:
   a plurality of ports associated with the number of subscribers;
   a plurality of interfaces operably coupled to the plurality of ports, respectively, wherein an interface is configured to enable transmission of a first communication signal between the master station location and a corresponding subscriber through an associated port;
   a further port configured to be linked to a digital subscriber modem, and further configured to be coupled to the subscriber via both a communication line in the device and the associated port;
   an addition circuit configured to merge signals from the plurality of ports to the further port to enable transmission of a second communication signal between the master station location and at least one of the subscribers over at least one associated port used to transmit the first communication signal to at least one of the subscribers; and
   a signal conditioning unit coupled between the addition circuit and the further port, the signal conditioning unit configured to split the second communication signal into an incoming communication signal and an outgoing communication signal.

2. The device according to claim 1, wherein the first communication signal comprises an analog telephone signal.

3. The device according to claim 1, wherein the first communication signal comprises an ISDN data signal.

4. The device according to claim 1, wherein the second communication signal comprises a broadband communication signal.

5. The device according to claim 1, further comprising at least one transformer configured to provide inductive coupling of the plurality of ports with the further port.

6. The device according to claim 5, wherein the addition circuit includes the at least one transformer, and wherein the at least one transformer includes a separate primary transformer winding corresponding to each of the plurality of ports and a common secondary transformer winding.

7. The device according to claim 5, wherein the at least one transformer further comprises a separate transformer operably coupled to each of the plurality of ports.

8. The device according to claim 1, further comprising at least one capacitor configured to provide capacitive decoupling of the plurality of ports from the further port.

9. The device according to claim 8, wherein the at least one capacitor is coupled between the plurality of ports and the further port.

10. The device according to claim 1, wherein the signal conditioning unit comprises a bridge circuit, the bridge circuit having a first branch formed by first impedances and a second branch formed by a second impedance and an impedance of a transmission path between at least one of the subscribers and the master station location, the bridge circuit further comprising a first tap configured to provide reception of incoming signals and a second, different tap configured to provide transmission of outgoing signals.

11. The device according to claim 1, further comprising a low-pass filter arranged between the interface and at least one of the plurality of ports.

12. The device of claim 1, wherein the device comprises a telephone line card.

13. A method for transmission of communication signals, via a device in a master station location, comprising:
- transmitting a first communication signal in a first frequency range from an interface of the device to any of a plurality of connected subscribers via a corresponding one of plurality of ports of the device, each of the plurality of ports corresponding to one of the plurality of connected subscribers;
- transmitting a second communication signal in a second frequency range from a digital subscriber modem to a connected subscriber via a further port, wherein a plurality of communication lines couple the further port to the plurality of ports of the device, the second frequency range differing from the first frequency range, the second communication signal having an access control characteristic associated with each of the plurality of connected subscribers; and
- downstream of the further port and upstream of the plurality of communication lines, splitting the second communication signal into an incoming communication signal and an outgoing communication signal;
- wherein at least part of a communication path between the further port and the corresponding one of the ports is shared by each of the plurality of ports to merge signals from the plurality of ports to the further port.

14. The method according to claim 13, wherein the access control characteristic comprises a CDMA access control characteristic.

15. The method according to claim 13, wherein the access control characteristic comprises a TDMA access control characteristic.

16. The method according to claim 13, further comprising employing splitterless paths between the plurality of ports and each of the interface and further port.

17. The method of claim 13, wherein the device comprises a telephone line card.

* * * * *